Feb. 11, 1958  G. OVERTON  2,822,879
DETACHABLE MOTOR DRIVEN SIDE CAR
Filed Dec. 27, 1951  3 Sheets-Sheet 1
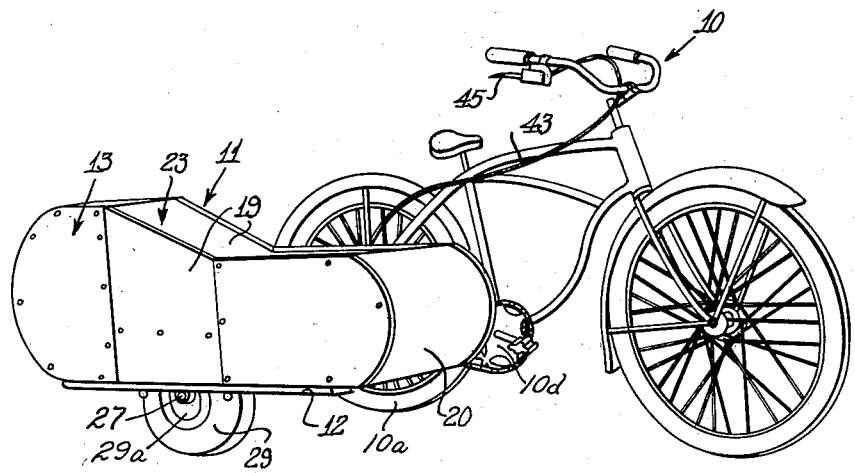
Inventor
Glen Overton

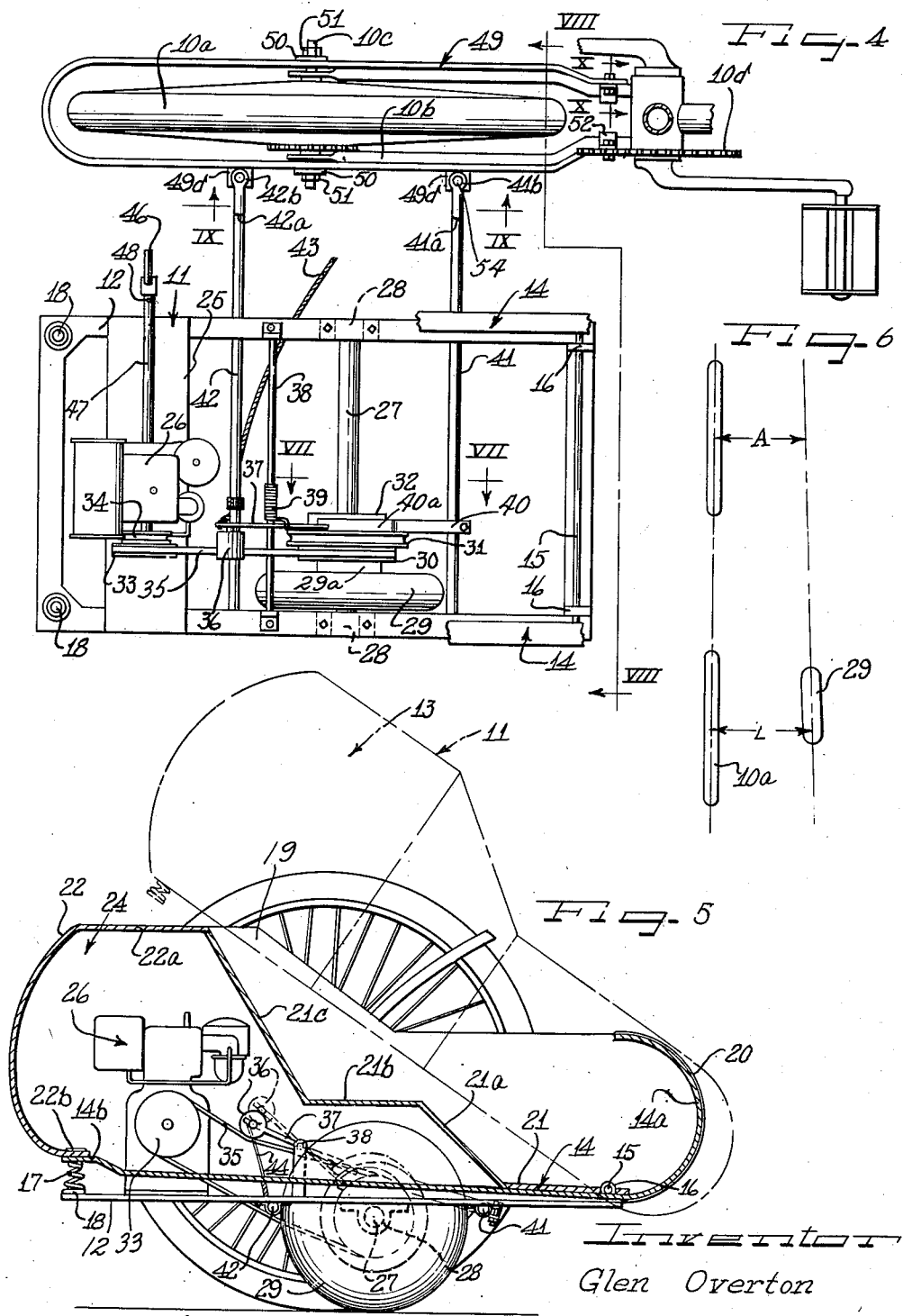

Feb. 11, 1958     G. OVERTON     2,822,879
DETACHABLE MOTOR DRIVEN SIDE CAR
Filed Dec. 27, 1951     3 Sheets-Sheet 3
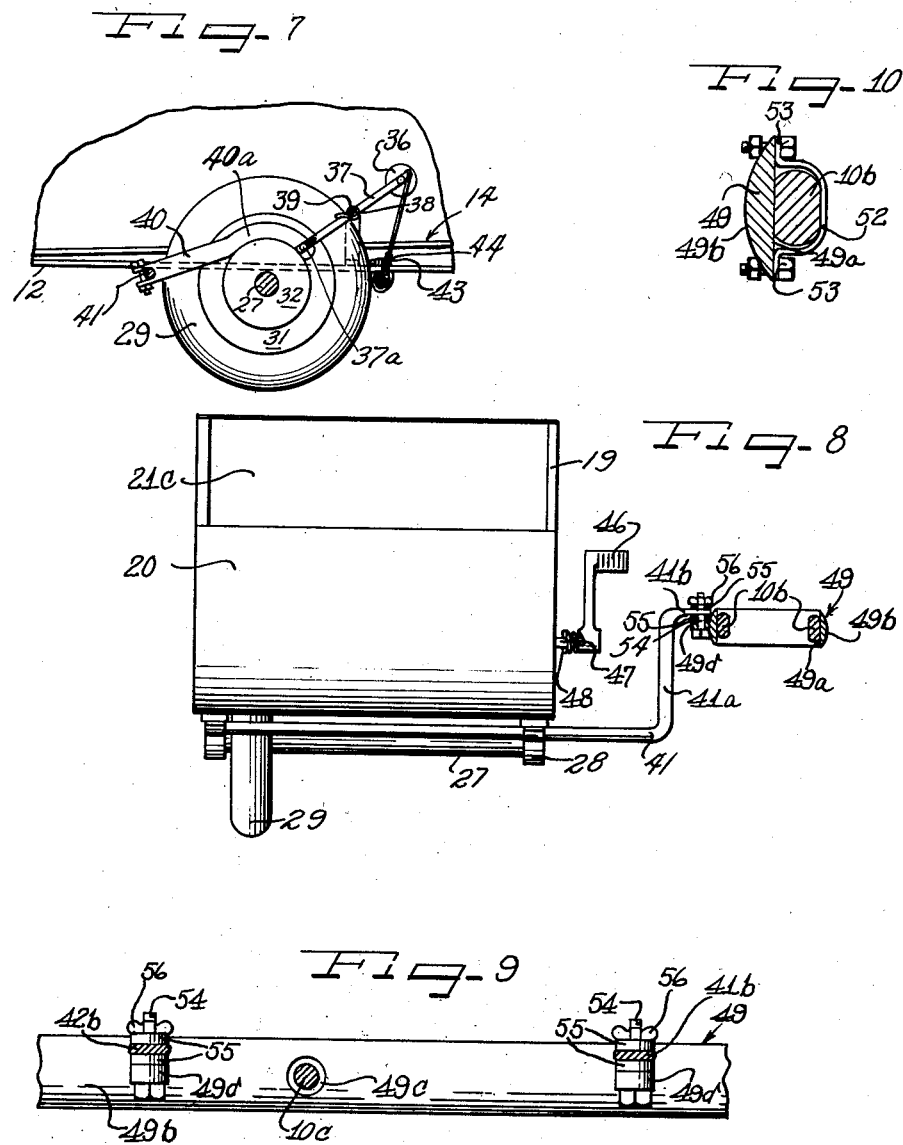
Inventor
Glen Overton

United States Patent Office 2,822,879
Patented Feb. 11, 1958

2,822,879
DETACHABLE MOTOR DRIVEN SIDE CAR

Glen Overton, Allegan, Mich., assignor to Overton Machine Company, Dowagiac, Mich., a corporation of Michigan Application December 27, 1951, Serial No. 263,657

7 Claims. (Cl. 180—11)

This invention relates to a detachable power driven wheeled unit for manually operated vehicles.

Specifically, this invention deals with a motor driven side car that is selectively attachable to a bicycle.

According to this invention, there is provided a chassis with laterally projecting support means for selective attachment to a U-shaped strap straddling the rear wheel of a bicycle and carried by the wheel axle and the chain stays of the bicycle frame. The chassis carries a small gasoline engine which drives a belt to rotate a small pneumatically tired wheel suspended from the chassis. The belt is selectively tightened by an idler pulley which is controlled from a hand grip on the handlebar of the bicycle through a Bowden wire connection. The idler pulley preferably operates in conjunction with a wheel brake in such a manner that the brake is released when the belt is tightened to drive the wheel and the brake is applied when the belt is loosened to disconnect the engine drive to the wheel, or, alternately, in such a manner that a partial grip on the hand grip disconnects the engine drive to the wheel, further pressure on the hand grip applies the brake, and complete release of the hand grip disconnects the engine drive to the wheel.

A body is hingedly mounted on the front end of the chassis and overlies the chassis and engine. Coil springs carried by the rear end of the body are automatically centered on conical abutments carried by the rear end of the chassis.

The side car of this invention is extremely simple in construction, efficient in operation, and inexpensive.

It is, then, an object of this invention to provide a self-propelled detachable wheeled unit for a manually operated vehicle.

Another object of the invention is to provide a motor driven side car for a bicycle.

A still further object of the invention is to provide a motor driven wheeled unit and a bicycle frame support for said unit which is easily attached to a standard bicycle.

A still further object of the invention is to provide a motor driven side car for a bicycle which is controlled through a Bowden wire from the bicycle handle bar.

A still further object of the invention is to provide a Bowden wire control for a motor driven unit which automatically applies a brake when the unit is declutched, and automatically releases the brake as the unit is clutched into operation.

Other and further objects of the invention will be apparent to those skilled in the art from the following detailed description of the annexed sheets of drawings which, by way of a preferred example only, illustrate one embodiment of the invention.

On the drawings:

Figure 1 is a perspective view of a bicycle equipped with a motor driven side car according to this invention.

Figure 2 is a fragmentary side elevational view of the side car and rear portion of the bicycle of Figure 1.

Figure 3 is a fragmentary enlarged view with parts in vertical cross section, illustrating the spring suspension for the side car of this invention.

Figure 4 is a fragmentary plan view, with parts in horizontal cross section, of the rear portion of a bicycle and the chassis portion of the side car of this invention with parts broken away to show underlying parts.

Figure 5 is a side elevational view similar to Figure 2 but illustrating the body in vertical cross section and showing the raised position of the body in dotted lines.

Figure 6 is a diagrammatic view illustrating a preferred wheel alignment relationship between the bicycle wheels and the side car wheel according to this invention.

Figure 7 is a vertical cross-sectional view taken along the line VII—VII of Figure 4.

Figure 8 is a vertical cross-sectional view taken along the line VIII—VIII of Figure 4.

Figure 9 is a fragmentary vertical cross-sectional view taken along the line IX—IX of Figure 4.

Figure 10 is a vertical cross-sectional view taken along the line X—X of Figure 4.

As shown on the drawings:

In Figure 1, the reference numeral 10 designates generally a bicycle equipped with a motor driven side car 11 according to this invention. The bicycle 10 has the conventional parts of a manually propelled bicycle and need not be reinforced with heavier wheels or the like to withstand the driving strain from the side car 11.

As shown in Figures 2, 4, and 5, the side car 11 has a rectangular frame or chassis 12 and a body 13 supported on the chassis. The body 13 has two parallel side beams 14, 14 in the form of flat plates having upturned arcuate front end portions 14a and upwardly offset rear end portions 14b as best shown in Figure 5. The beams 14 are pivotally connected to the front frame beam of the chassis through a cross rod 15 which is carried in lugs 16 on this front frame beam. The upwardly offset portions 14b of the beams 14, as best shown in Figure 3, have coil springs 17 depending therefrom. The rear end of the chassis 12 has frusto-conical abutments 18 mounted thereon for fitting into the bottom end coils of the springs 17 to automatically center the springs on the chassis when the body is lowered into position.

The body has side walls 19, best shown in Figure 1, extending upwardly from the beams 14 and a curved front wall 20 forming a dashboard. A bottom 21 extends from the bottom of the dashboard 20 to form a floor at the front end of the body and is upwardly offset at 21a (Figure 5) to a higher level between the side plates 19. The plate is then offset at 21b to form a seat and is inclined upwardly from the seat portion at 21c to form a rear wall. A rear end wall 22 is curved like the front wall 20 and has a flat top wall portion 22a attached to the upper end of the sloping part 21c and a bottom edge 22b attached to the end portions 14b of the beams 14, 14. The plates 20, 21, and 22 are, of course, connected to the side walls 19.

From the above description, it will be understood that the body provides a passenger space 23 with a seat and a floor, and also provides a compartment 24 behind the seat. The compartment 24 has an open bottom.

The rear end portion of the frame 11, as shown in Figure 4, carries a plate 25 supporting a small gasoline engine 26 which is adapted to project into the compartment 24 as shown in Figure 5.

An axle 27 is rotatably suspended in bearings 28 mounted on the side frame beams of the frame 11 as shown in Figure 4. The axle 27 is rotatable and extends transversely across the space between the side beams of the frame.

A pneumatic tire-equipped small diameter wheel 29 is secured on the axle 27 adjacent the outer side frame beam. This wheel is preferably of the same type used for the tail skid wheels of small aircraft.

The hub 29a of the wheel 29 extends inwardly from the wheel and carries a small diameter pulley 30, a larger diameter pulley 31, and a brake drum 32 in successive adjoining relation.

The motor 26 has a pulley 33 aligned with the pulley 30, and a second pulley 34 aligned with the pulley 31. A belt 35, preferably of the V-type, drivingly connects the pulley 33 with the pulley 30, or, alternately, connects the pulley 34 with the pulley 31. Since the pulley 33 is larger than the pulley 34, while the pulley 30 is smaller than the pulley 31, a two-speed drive ratio is provided by selective positioning of the belt.

The belt 35 is loosely trained between the selected pairs of pulleys and will not drive the wheel and axle unless it is tightened by an idler pulley 36 which overlies the upper run of the belt. This pulley 36 is mounted on the end of a lever 37. The lever 37 is pivoted on a cross rod 38 secured on the side frame beams of the frame 12 and extending across the space between these beams. A torsion spring 39 anchored on this rod 38 acts on the lever 37 to raise the pulley 36 away from the belt 35, thereby declutching the wheel from the motor.

The lever 37 has a leg beyond its pivot rod 38 pivotally connected at 37a to a brake 40 which is swingably mounted on a transversely extending support member 41 secured to the bottom of the side frame beams of the frame 12. A second parallel transverse support member 42 is also provided rearwardly from the member 41. The members 41 and 42 project laterally inward from the side car.

The brake member 40 has an arcuate brake shoe 40a for engaging the brake drum 32. When the spring 39 is free to act for tilting the lever 37 to raise the pulley 36 away from the belt 35, the brake shoe 40a will be applied against the brake drum to hold the wheel and axle against rotation. In this position of the lever, shown in dotted lines in Figure 5, the idler pulley 36 is raised off of the belt.

A Bowden wire control is provided for the lever 37 and includes a Bowden wire cable 43 extending under the frame and having its end anchored to the support member 42 immediately under the lever 37. The Bowden wire 44 in the cable 43 extends beyond the end of the cable and is attached to the end of the lever 36. When the Bowden wire is pulled into the cable, the lever will be tilted to pull the idler pulley against the belt 35 and drivingly connect the motor with the wheel while at the same time releasing the brake shoe 48 from the brake. As shown in Figure 1, the Bowden cable extends to the handlebar of the bicycle 10 and has its wire actuated by a handle grip 45 on the handlebar immediately under the handlebar grip. When the lever grip 45 is squeezed toward the handle bar grip, the Bowden wire will be pulled to tilt the lever against the action of the spring 39 and cause the engine to drive the wheel while releasing the brake. When the handle 45 is released, on the other hand, the brake will be automatically applied and the engine will be uncoupled from the wheel.

Alternately, the load of the spring 39 on the lever 37 can be reversed so as to tilt the lever in a direction to press the idler pulley against the belt and to raise the brake. In this alternate arrangement, the Bowden wire connection will be at the brake shoe end of the lever, and release of the hand grip 45 will cause the motor to be coupled to the wheel and the brake to be released. Partial pressing of the hand grip 45 will uncouple the drive to the wheel, and full pressure on the hand grip 45 will then apply the brake.

The engine 26 is cranked by means of a kick pedal 46 on an extension 47 of the engine crankshaft. The pedal is adjacent the inner side of the body 13 and is easily accessible to the driver's right foot. The kick pedal has a slot engaging a pin 48 on the crankshaft extension and spring urged away from this pin so that the pedal will not rotate with the shaft when the engine is operating.

As shown in Figures 4 and 8, the rods 41 and 42 project laterally inward from the inner side of the side car and have upturned legs 41a and 42a respectively terminating in horizontal eye ends 41b and 42b respectively.

A U-frame 49 straddles the rear wheel 10a of the bicycle 10 and overlies the chain forks 10b of the bicycle frame. The frame 49 is composed of a stiff metal band having a flat inner face 49a for abutting the chain forks 10b together with an arcuate outer face 49b presenting a smooth outer surface. The strap or U-frame 49 is apertured at 49c (Figure 9) to receive the ends of the rear wheel axle 10c therethrough. Washers 50 (Figure 4) overlie the apertured portions 49c of the strap and nuts 51 force the washers to press the strap tightly against the chain forks 10b. The forward ends of the strap are inwardly offset to follow the contour of the chain forks 10b and terminate immediately behind the crank sprocket 10d of the bicycle as shown in Figure 4. Clamps 52 embrace the chain forks immediately adjacent this hub 10b and receive bolts 53 therethrough which extend from the forward ends of the strap so that the strap will be securely clamped to the chain forks at its forward end.

The frame 49 is thus securely attached to the rear end portion of the bicycle 10 and reinforces the bicycle frame.

Lugs 49d are formed on the outer faces 49b of the frame 49 on opposite sides of one of the holes 49c through the frame to receive the eye ends 41b and 42b of the rods 41 and 42. As shown in Figures 8 and 9, the lugs 49d are apertured and each receive the shank of a bolt 54 therethrough. The bolt shanks project above the lugs and through the eye ends of the rods. Rubber washers 55 are mounted on the bolt shanks on opposite sides of the eye ends of the rods to cushion the rods. Wing nuts 56 are provided for each bolt. The nut and bolt connections are easily made and the side car 11 is thereby readily mounted on and detachable from the frame strap 49. In addition, the frame strap 49 is easily attachable to a standard bicycle without redesign of any of the bicycle parts. Since the rods 41 and 42 are rigidly affixed to the chassis 12 and are attached to rigid spaced supports 49d, the side car cannot swing relative to the bicycle even if the wing nuts 56 become loosened. The rubber washers 55, however, act as cushions for these wing nuts as well as the rods, so that loosening of the nuts is quite unlikely.

When the side car is attached to a bicycle, the supports 41 and 42 automatically align the side car wheel 29 with the bicycle wheels as shown in Figure 6. Thus, the wheel 29 is toed-in so that distance B is greater than A. This toe-in makes it easy to steer the bicycle and keep it in a straight ahead path. Also, the axis of the wheel 29 is ahead of the axis of the rear bicycle wheel 10a to decrease the tendency to swing the bicycle about the axis of the rear wheel.

From the above descriptions it will therefore be understood that this invention provides a detachable power driven unit for a bicycle or the like which can be easily mounted on any standard bicycle and detachable from the bicycle by removal of two simple fasteners. The preferred unit is a side car having a frame and a body pivoted on the frame to provide either a passenger or storage compartment and to also form a hood for the motor. An inexpensive spring suspension is provided for the body.

It will also be understood from the above description that the power driven unit of this invention is controlled from a single operating handle on the bicycle which provides a safety feature to automatically declutch the motor and apply the brakes when the handle is released.

It will be understood that modifications and variations may be effected without departing from the scope of the novel concepts of the present invention.

I claim as my invention:

1. A power driven attachment for a bicycle comprising a frame, means projecting from said frame, fasteners coacting with said means for attaching the frame rigidly to a bicycle, an engine carried by said frame, a wheel rotatably supported by said frame, means on said frame selectively connecting said engine with said wheel to drive the wheel from the engine, spring pads on one end of said frame, a body pivotally mounted on the other end of said frame, springs carried by said body for coacting with said pads, and said body defining a hood for said engine and a passenger compartment.

2. A self-propelled wheeled attachment for a bicycle which comprises a chassis, a wheel supporting said chassis above the ground, an engine on said chassis, a body member pivoted on a front end of said chassis and forming a passenger compartment and a hood for the engine, springs depending from a rear end of the body member, and spring pads on the chassis coacting with said springs to center the body member on the chassis.

3. In a bicycle assembly having front and rear wheels, the improvement of a side car mounted in spaced lateral relation from said rear wheel, said side car having a power driven wheel, and said power driven wheel being spaced from said rear wheel of the bicycle and toed-in toward said front wheel of the bicycle so that a plane passing through said power driven wheel will lie closer to the front wheel of the bicycle than to the rear wheel of the bicycle.

4. A self-propelled wheeled attachment for a bicycle which comprises a chassis, a wheel supporting said chassis above the ground, an engine on said chassis, a body member pivoted on a front end of said chassis and forming a passenger compartment and a hood for the engine, and cushioning means between a rear end of said chassis and an adjoining portion of said body member.

5. In a driven bicycle assembly having front and rear wheels supporting a seat, the improvement of a side car mounted in spaced lateral relation from said rear wheel, said side car having a supporting wheel, and said supporting wheel being laterally spaced from the rear wheel of the bicycle and toed-in toward said front wheel of the bicycle so that a plane passing said supporting wheel will lie closer to the front wheel of the bicycle than to the rear wheel of the bicycle.

6. In a power driven wheeled unit in combination with a bicycle or the like having a frame, a chain fork and a crank hub; said unit having a frame, a pair of supports projecting laterally from said unit frame, a U-shaped strap straddling the chain forks of said bicycle frame and receiving the rear wheel axle therethrough, fasteners on the ends of the legs of the U-shaped strap attaching said legs to said chain fork adjacent said crank hub, lugs projecting from one leg of the strap on opposite sides of the axle receiving portion thereof, fasteners attaching said laterally projecting supports to said lugs, a motor supported on said unit frame, a driven wheel rotatably suspended from said unit frame and supporting the frame above the ground, power transmission means from said motor to drive said wheel, a brake for said wheel, control means selectively deactivating the power transmission means while energizing the brake means, and a body pivoted on said unit frame for overlying said wheel and motor and providing a passenger compartment, said wheel being in assembly with said bicycle spaced laterally therefrom and being toed-in toward a front wheel of said bicycle so that a plane passing through said driven wheel lies closer to the front wheel of the bicycle than to the rear wheel of the bicycle.

7. In combination with a bicycle, a self-contained wheeled attachment for the rear wheel of said bicycle and spaced generally rearward of the bicycle sprocket, comprising a wheel supported chassis disposed alongside the bicycle rear wheel and having lateral arms generally at right angles to the plane of said bicycle wheel and terminating in a fork generally at right angles to said arms and straddling the bicycle wheel with its forward free ends rigidly secured to said bicycle adjacent the bicycle sprocket, a body carried by said chassis, prime mover means for said attachment and carried by said chassis including clutching and braking means for controlling the driving of said attachment by said prime mover and means for actuating said clutching and braking means completely independent of any movement of the bicycle to which the attachment is applied, said attachment including a driven wheel in assembly with said bicycle spaced laterally therefrom and toed-in toward the front wheel of said bicycle so that a plane passing through said driven wheel will lie closer to the front wheel of the bicycle than to the rear wheel of the bicycle.

References Cited in the file of this patent

UNITED STATES PATENTS

| 688,743 | Morton | Dec. 10, 1901 |
| 1,077,743 | Overton | Nov. 4, 1913 |
| 1,196,137 | Morrow et al. | Aug. 29, 1916 |
| 1,215,265 | Finlay | Feb. 6, 1917 |
| 1,231,163 | Jaggard | June 26, 1917 |
| 1,269,558 | Neracher | June 11, 1918 |
| 1,354,618 | Lindner | Oct. 5, 1920 |
| 1,417,822 | Grew | May 30, 1922 |
| 2,517,162 | Arman | Aug. 1, 1950 |
| 2,552,846 | Dinkins | May 15, 1951 |

FOREIGN PATENTS

| 9,228 of 1905 | Great Britain | Mar. 1, 1906 |
| 13,423 of 1914 | Great Britain | May 27, 1915 |
| 111,589 | Great Britain | Dec. 6, 1917 |
| 251,456 | Great Britain | May 6, 1926 |
| 363,397 | France | July 30, 1906 |
| 871,040 | France | Jan. 3, 1942 |